United States Patent [19]
Forester

[11] 3,915,112
[45] Oct. 28, 1975

[54] METER POSITION INDICATOR

[76] Inventor: Stanley Forester, 14063 S.W. 272 St., Naranja, Fla. 33030

[22] Filed: Nov. 25, 1974

[21] Appl. No.: 526,539

[52] U.S. Cl. ...... 116/124 R; 116/114 K; 248/206 A; 324/110
[51] Int. Cl.² .................. G09F 9/00; F16B 47/00
[58] Field of Search ............. 116/124 R, 114 K; 248/206 A; 33/DIG. 1; 324/110, 156

[56] References Cited
UNITED STATES PATENTS

| 2,359,628 | 10/1944 | Daly | 324/110 |
| 3,258,232 | 6/1966 | Nestegard | 248/206 A |
| 3,310,875 | 3/1967 | Kowalski | 116/114 K |
| 3,478,717 | 11/1969 | Kidd | 116/124 R |

Primary Examiner—Richard C. Queisser
Assistant Examiner—Daniel M. Yasich

[57] ABSTRACT

An indicator to be secured inside of the glass cover of a meter to show when the meter is rotated as a unit, the indicator includes a frame fixed to the meter and a flag member in a normal position hidden behind a portion of the frame and which flag is movable between the normal position to a second position wherein the flag is visible whenever the meter is rotated about an axis perpendicular to the face on which the indicator is mounted and the indicator includes magnetic means to hold the flag in the second position so that one inspecting the meter will know that it has been physically rotated or tampered with.

8 Claims, 11 Drawing Figures

METER POSITION INDICATOR

FIELD OF THE INVENTION

This invention relates to meters and, more particular to an indicator for attachment to a meter in a position which is visible inside the meter and which indicates when the meter is rotated upon itself.

BACKGROUND OF THE INVENTION

There are persons who will disconnect a meter, such as an electrical meter, and rotate it about as a unit through 180° of rotation and reconnect it. As a result, the meter will run backwards. Thus a person reversing a meter for one week of a month will cause one week of the month to be subtracted from the meter which will require another week to be restored, in effect providing 2 weeks of free service in a 4 week period during which the meter has been reversed for one week.

This invention has as an object the provision of an indicator shown in three alternative embodiments to indicate whenever a meter has been rotated and provides a simple, inexpensive indicator means to show when a meter is reversed or has been reversed and restored to its normal position.

Generally speaking it is an object of this invention to provide a flag which is in a normal position and swingable or movable upon rotation of the meter, the movement being caused by gravity forces, to a position which indicates that the meter has been rotated and in which position it is held by magnetic means, so that even though the meter is restored to its correct position, the meter will still indicate that it has been tampered with.

In accordance with these and other objects which will become apparent hereinafter, the instant invention will now be described with reference to the accompanying drawings in which:

DESCRIPTION OF THE DRAWINGS

FIGS. 6, 7, 8 and 9 are of an alternative embodiment of the instant invention in which:

FIG. 6 is a partial view similar to FIG. 1; and

FIG. 7 is a partial view similar to FIG. 2;

FIG. 8 is a view in cross section taken on the plane indicated by the line 8—8 of FIG. 6 and looking in the direction of the arrows; and FIG. 9 is a view in cross section taken on the plane indicated by the line 9—9 of FIG. 8 and looking in the direction of the arrows; and FIGS. 10 and 11 are of a second alternative embodiment in which:

FIG. 10 is a view of an indicator device mounted to the inside surface of a glass meter face and illustrating a third alternative embodiment; and FIG. 11 is a view similar to FIG. 10 and illustrating the flag in a second position indicating rotation of the meter.

DESCRIPTION OF THE PREFERRED EMBODIMENTS

Generally, the invention consists of an indicator to be attached to a meter in a visible location within the meter which is inaccessible without destroying the meter. The indicator comprises a frame with an upper portion and a lower portion and means to secure the frame to the meter in an inaccessible visible location. The indicator also includes a movable flag member which is in a first normal position and mutually intercooperating magnetic means are included so that the flag member which is movably mounted for movement between a normal position and a second position will be captivated when moved to the second position by forces of gravity, that is when the flag member is in a second position the magnetic means are magnetically attracted and hold the flag in a position which indicates that the meter has been rotated or reversed.

Figure 1:
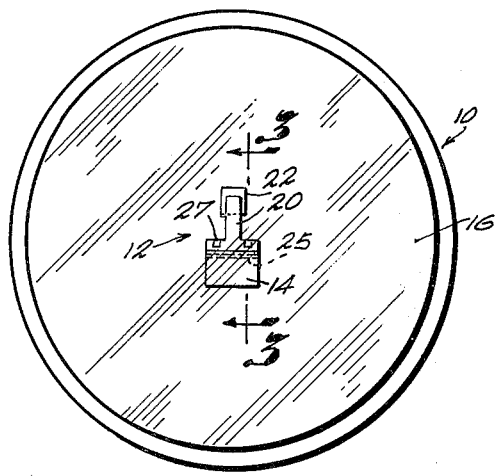
FIG. 1 is an outside view of a meter provided with the instant invention.
Figure 2:
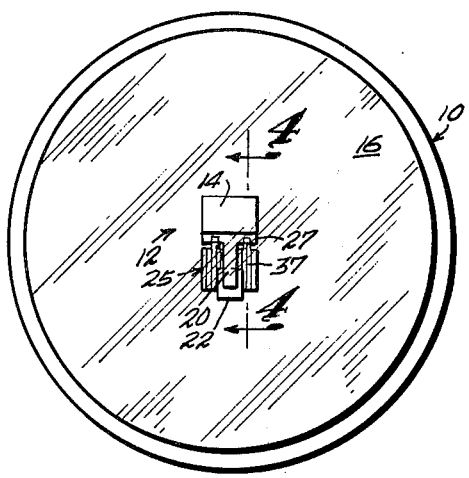
FIG. 2 is a view similar to FIG. 1, with the exception that the meter has been rotated through 180° as a unit about an axis perpendicular to FIG. 1.
Figure 3:
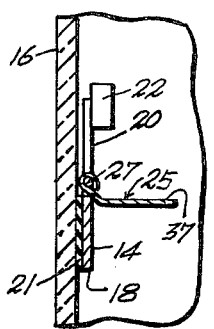
FIG. 3 is a view in cross section taken on the plane indicated by the line 3—'of FIG. 1.
Figure 4:
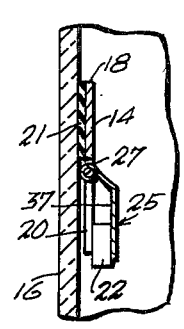
FIG. 4 is a view taken in cross section on the plane indicated by the line 4—4 of FIG. 2.
Figure 5:
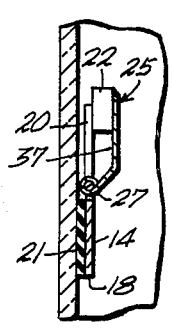
FIG. 5 is a view similar to FIG. 4 with the exception that the unit has been rotated through 180° about the axis referred to above.

Referring to the first embodiment shown in FIGS. 1 through 5, there is shown a meter 10 provided with an indicator generally designated by the numeral 12. The indicator is mounted at a location at which it is visible but inaccessible, such as adhered to the inside surface of the front glass 16 of the meter. It includes a frame 14 having a lower portion 18 and an upper portion 20 and an inside surface and an outside surface. Adhesive means 21 may be provided to secure the frame of the indicator in view through the glass of the meter. To the frame a movable flag member 25 is movably mounted as by pivot pin means 27 which extend through a pivot connection pair of spaced lugs on an intermediate lateral portion of the frame and flag member. The flag member is shown in the normal position in FIG. 3. Magnetic means are mounted as at 22 to the upper portion of the frame. The flag member is shown in the normal position in FIG. 3; however, on rotation of the meter through 180° about an axis perpendicular to the meter as shown in FIG. 1, forces of gravity acting upon the flag will cause it to fall to the position shown in FIG. 3 and, because it also includes magnetic means, i.e., is of ferrous metal at least in part, it will be engaged by the magnetic means 22; so that, even though the unit is re-rotated to the upper position as indicated in FIG. 5, the indicator surface 37 of the flag member will remain visible. The magnetic means 22 and the ferrous metal of flag 25 constitute mutual interconnecting holding means.

Figures 6, 7:
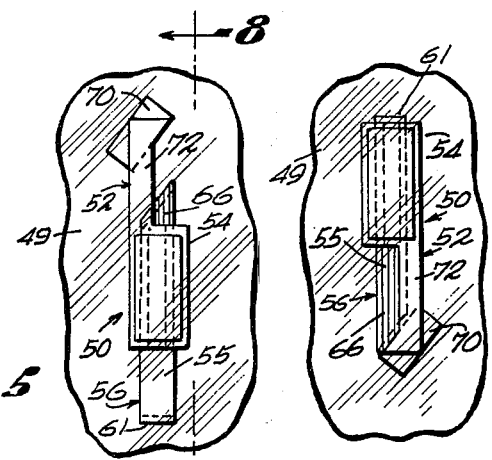

Referring to the second perferred embodiment, that shown in FIGS. 6, 7, 8 and 9, to the inside surface of the meter glass 49 the indicator 50 is suitably applied. It includes a frame 52 with a vertical track means 54, see FIG. 9, of channel form with the longitudinally extending terminal ends folded over to define a track for companionate sliding engagement with a captivated slide bar 55 on a slide type flag member 56, with the slide bar being captivated in the track by means of a turned over end 61. The flag member has a flag portion 66 of ferro-magnetic material. As shown in FIG. 6, the flag member 66 is in a normal position; however, when the meter is rotated through 180° to the position shown in FIG. 7, the force of gravity will cause the flag member to slide downwardly in the track until the end 66 engages a magnet 70 which is carried on an arm 72 of the frame. Preferably the magnet is at an angle with respect to the longitudinal vertical centerline of the channel indicator so that the slide bar, when in engagement with the magnet, will be slightly askew, tending to bind, and not be susceptible to being joggled downwardly to be released from the magnet.

Figure 10:
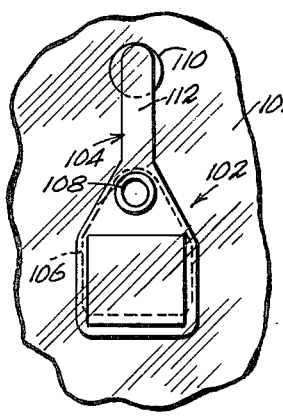
Figure 11:
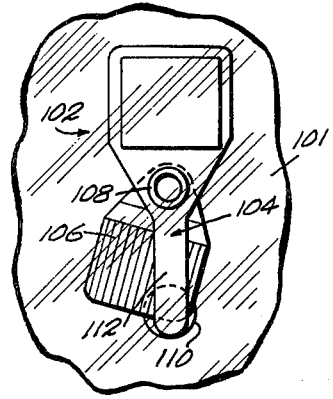
Figure 8:
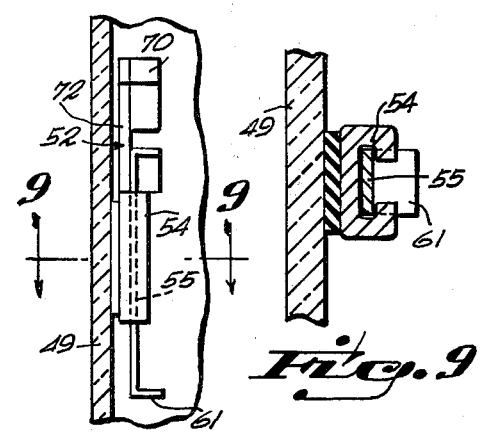

Referring to the embodiment of FIGS. 10 and 11, to the surface of the glass 101, the indicator 102 is adhered. It again includes a frame 104 and a flag member 106 which is pivotally connected as at 108 about a pivot axis which is perpendicular to the glass, so that when the meter is rotated, the flag member is free to rotate about the pivot means from the position shown in FIG. 10 to the position shown in FIG. 11. Again the flag member is of ferro-magnetic material and, when in the position shown in FIG. 11 engages a magnetic means 110 fixed on an arm 112 of the frame of the indicator.

It is thus seen that there has been provided a simple, inexpensive series of preferred embodiments which will indicate when a meter has been tampered with.

What is claimed is:

1. For use on a meter, an indicator to show when the meter has been physically rotated as a unit about a lateral axis through the meter, comprising:
   A. a frame having (a) an upper portion and (b) a lower portion, and (c) a first and (d) a second main surface;
   B. means to secure the frame to the meter in a normally inaccessible visible location in the meter;
   C. a movable flag member in a first normal position adjacent said lower portion;
   D. mutually intercooperating magnetic means including a first magnetic means mounted to the upper portion and a second magnetic means on the flag member;
   E. means movably mounting said flag member for movement between said normal position and a second position;
   F. said second position being one in which said first and said second magnetic means are magnetically attracted and held in engagement with one another and in which the flag member is visible and magnetically captivated by the magnetic means adjacent the upper portion, so that at least the portion of said flag member is visible, whereby when the meter is rotated as a unit through 180° about a lateral axis, the flag will move by gravity forces between said normal position to said second position and be held in said second position by the magnetic field of said magnetic means.

2. The device as set forth in claim 1 wherein said means mounting comprises a pivot pin means.

3. The device as set forth in claim 1 wherein said means mounting are intermediate the length of said frame between said upper and lower portion.

4. The device as set forth in claim 2 wherein the axis of said pivot means is laterally oriented.

5. The device as set forth in claim 2 wherein said pivot means includes a pin extending perpendicular to said frame.

6. The device as set forth in claim 1 wherein said means mounting comprises track means on said frame and means slidably captivating said flag member in said track means.

7. The device as set forth in claim 6 wherein said first magnetic means is arranged on said upper portion at a position which is laterally oriented with respect to the centerline of said track means so that when said magnetic means are in magnetic engagement said flag will bind restraining sliding movement along said track means.

8. For use on a meter, an indicator to show when the meter has been physically rotated as a unit about a lateral axis through the meter, comprising:
   A. a frame having (a) an upper portion and (b) a lower portion, and (c) a first and (d) a second main surface;
   B. means to secure the frame to the meter in a normally inaccessible visible location in the meter;
   C. a movable flag member in a first normal position adjacent said lower portion;
   D. mutually intercooperating holding means including a first member mounted to the upper portion and a second member on the flag portion;
   E. means movably mounting said flag member for movement between said normal position and a second position;
   F. said second position being one in which said first and said second members are engaged with one another and held in engagement with one another and in which the flag member is visible and captivated by the holding means comprising said members adjacent the upper portion, so that at least the portion of said flag member is visible, whereby when the meter is rotated as a unit through 180° about a lateral axis, the flag will move by gravity forces between said normal position to said second position and be held in said second position by said holding means.

* * * * *